United States Patent
Wu et al.

(10) Patent No.: US 9,813,312 B2
(45) Date of Patent: Nov. 7, 2017

(54) SYSTEMS AND METHODS FOR PERFORMING DEBUGGING OPERATIONS ON NETWORKS USING A CONTROLLER

(71) Applicant: Big Switch Networks, Inc., Santa Clara, CA (US)

(72) Inventors: Xin Wu, Sunnyvale, CA (US); Rajneesh Bajpai, San Jose, CA (US); Robert W. Sherwood, Oakland, CA (US); Srinivasan Ramasubramanian, Sunnyvale, CA (US); Gregor Mathias Maier, Alameda, CA (US); Richard Leegan Lane, II, Mountain View, CA (US); Kenneth Hsinchao Chiang, Fremont, CA (US); Mei Yang, Fremont, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 119 days.

(21) Appl. No.: 14/626,450

(22) Filed: Feb. 19, 2015

(65) Prior Publication Data
US 2016/0020993 A1    Jan. 21, 2016

Related U.S. Application Data

(60) Provisional application No. 62/027,238, filed on Jul. 21, 2014.

(51) Int. Cl.
*H04L 12/26* (2006.01)
*H04L 12/721* (2013.01)
(Continued)

(52) U.S. Cl.
CPC ............ *H04L 43/06* (2013.01); *H04L 43/028* (2013.01); *H04L 43/04* (2013.01);
(Continued)

(58) Field of Classification Search
CPC ....................................................... H04L 43/06
See application file for complete search history.

(56) References Cited

U.S. PATENT DOCUMENTS 8,116,312 B2    2/2012  Riddoch et al.
8,392,608 B1    3/2013  Miller et al.
(Continued)

FOREIGN PATENT DOCUMENTS

WO    2013126195    8/2013

OTHER PUBLICATIONS

Lee Bu-Sung et al., "An Efficient Flow Cache Algorithm with Improved Fairness in Software-Defined Data Center Networks", 2013 IEEE 2nd International Conference on Cloud Networking (Cloudnet), IEEE, Nov. 11, 2013 (Nov. 11, 2013), pp. 18-24, XP032550314, DOI: 10.1103/Cloudnet.2013.6710553.
(Continued)

*Primary Examiner* — Jason Mattis
(74) *Attorney, Agent, or Firm* — Treyz Law Group, P.C.; Michael H. Lyons

(57) ABSTRACT

A controller implemented on computing equipment may control switches in a network. The controller may provide flow tables that implement network policies to the switches to control packet forwarding through the network. The controller may provide debug table entries to the switches for use in a debug table that is separate from the flow table. The debug table entries may match incoming network packets and increment corresponding counters on the switches. The controller may retrieve count information from the counters for performing debugging operations on the network. For example, the controller may identify conflicts between fields of a selected flow table entry, determine whether elephant packet flows are present between switches, determine whether desired load balancing is being per-
(Continued)

formed, determine whether a network path has changed, determine whether packet loss has occurred, and/or determine whether network packets are taking undesired paths based on the retrieved count information.

14 Claims, 13 Drawing Sheets

(51) Int. Cl.
*H04L 12/741* (2013.01)
*H04L 12/803* (2013.01)
*H04L 12/24* (2006.01)

(52) U.S. Cl.
CPC ...... *H04L 43/0829* (2013.01); *H04L 43/0847* (2013.01); *H04L 45/14* (2013.01); *H04L 45/745* (2013.01); *H04L 47/125* (2013.01); *H04L 41/0645* (2013.01); *H04L 43/026* (2013.01)

(56) References Cited

U.S. PATENT DOCUMENTS

| | | | |
|---|---|---|---|
| 8,924,787 B2 | 12/2014 | Lumezanu et al. | |
| 9,137,165 B2* | 9/2015 | Anand | |
| 2002/0061018 A1 | 5/2002 | Chien | |
| 2004/0170173 A1 | 9/2004 | Pan et al. | |
| 2005/0157749 A1 | 7/2005 | Lee et al. | |
| 2008/0189769 A1 | 8/2008 | Casado et al. | |
| 2010/0128743 A1 | 5/2010 | Nagano | |
| 2012/0051229 A1 | 3/2012 | Feldmann et al. | |
| 2012/0131222 A1 | 5/2012 | Curtis et al. | |
| 2013/0010600 A1* | 1/2013 | Jocha | H04L 43/026 370/236.2 |
| 2013/0242759 A1 | 9/2013 | Durrani et al. | |
| 2013/0272135 A1* | 10/2013 | Leong | H04L 41/0823 370/241 |
| 2014/0036689 A1* | 2/2014 | Zheng | H04L 43/0888 370/241.1 |
| 2014/0112190 A1 | 4/2014 | Chou et al. | |
| 2014/0241356 A1* | 8/2014 | Zhang | H04L 45/38 370/392 |
| 2014/0325649 A1* | 10/2014 | Zhang | H04L 43/024 726/23 |
| 2015/0016255 A1* | 1/2015 | Bisht | H04L 47/11 370/235 |

OTHER PUBLICATIONS

"OpenFlow Switch Specification", Open Networking Foundation, Apr. 25, 2013 (Apr. 25, 2013), XP055213379, Retrieved from the Internet: <URL:https://www.opennetworking.org/images/storeis/downloads/sdn-resources/onf-specifications/openflow/openflow-spec-v1.3.2.pdf>.
Pfaff et al., OpenFlow Switch Specification, Dec. 31, 2009, 42 pages.
Mckeown et al., OpenFlow: Enabling Innovation in Campus Networks, Mar. 14, 2008, 6 pages.
Cisco Systems, Cisco Catalyst 6500 Architecture, 1992-2007, 28 pages.
Casado et al., "SANE: A Protection Architecture for Enterprise Networks," Usenix Security, Aug., 2006 (15 pages).
Casado et al., "Ethane: Taking Control of the Enterprise," Conference of Special Interest Group on Data Communication (SIGCOMM), Japan, Aug., 2007 (12 pages).
Koponen et al., "Onix: A Distributed Control Platform for Large-scale Production Networks," Usenix Security, Oct., 2010 (14 pages).
Sherwood et al. "FlowVisor: A Network Virtualization Layer," Open Flow Technical Reports, Oct. 14, 2009 (Abstract and 14 pages) [Retrieved on Jan. 4, 2011]. Retrieved from the Internet<URL: http://openflowswitch.org/downloads/technicalreports/openflow-tr-2009-1-flowvisorpdf.
Forster et al., U.S. Appl. No. 14/085,538, filed Nov. 20, 2013.

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ADDITIONAL PACKET INFORMATION (E.G., HEADERS) | ACTION |
|---|---|---|---|---|---|---|---|---|
| * | * | 00:1FAB | * | * | * | * | | SEND TO PORT 3 |
| * | * | * | * | 172.12.3.4 | * | * | ⋮ | SEND TO PORT 4 |
| * | * | * | * | * | * | 80 | | DROP |

FIG. 4

SYSTEMS AND METHODS FOR PERFORMING DEBUGGING OPERATIONS ON NETWORKS USING A CONTROLLER

This patent application claims the benefit of provisional patent application No. 62/027,238, filed Jul. 21, 2014, which is hereby incorporated by reference herein in its entirety.

BACKGROUND

This relates to communication networks, and more particularly, to communications networks having network switches that are controlled by a controller.

Packet-based networks such as the Internet and local data networks that are connected to the internet include network switches. Network switches are used in forwarding packets from packet sources to packet destinations. The packets may be sometimes referred to as frames. For example, data is forwarded over layer 2 of the Open Systems Interconnection (OSI) model as frames (e.g., Ethernet frames), whereas data is forwarded over layer 3 of the OSI model as packets (e.g., Internet Protocol packets).

It can be difficult or impossible to configure the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

It can be challenging for a controller to efficiently control a network of switches. For example, the network topology may be modified by a network administrator or due to device failure. In this scenario, the network modifications may potentially result in invalid configurations at the controller and inefficient packet routing or packet loss in the network. In networks with a large number of switches, it may be difficult to pinpoint the source of packet loss or sources of packet routing inefficiencies in the network.

It would therefore be desirable to provide the controller with improved network debugging capabilities.

SUMMARY

A controller implemented on computing equipment may be used to control switches in a network. The switches may include physical switches and logical switches such as hypervisor switches. End hosts may be coupled to the switches in the network. The switches may be controlled by the controller for forwarding network packets through the network (e.g., by supplying control messages that are different from the network packets to the switches over control paths). The control messages may include flow table entries for use in flow tables implemented on the switches. The switches may match received network packets to the flow table entries to perform packet forwarding operations through the network. The flow table entries may be generated by the controller to implement one or more desired network policies (e.g., network forwarding policies) identified at the controller.

The controller may generate and provide debug table entries to the switches. The switches may add the debug table entries to debug tables implemented on the switches that are separate from the flow tables used to route network packets through the network. The debug table entries may include matching information (sometimes referred to herein as matching fields or header fields) and corresponding action fields that instruct the switch to perform a desired action when a network packet matches on the corresponding matching field. The flow table may have entries with action fields associated with performing network forwarding operations (e.g., for implementing desired network policies), whereas the debug table may have entries with action fields that instruct the switch on which the tables are implemented to increment corresponding counters. The controller may monitor the counters maintained on the switches for performing debugging operations on the network.

In other words, the flow tables on the switches may be used to implement desired network policies (e.g., access policies such as access control lists or packet routing policies) whereas the debug tables are used to generate switch counter values that are processed at the controller to perform network debugging operations. If desired, the debug action fields may instruct the switch to forward matching network packets or copies of the matching network packets to the controller. In this way, when a network packet is received at a switch and matches on debug table entries in a debug table implemented on the switch, the switch may increment one or more associated counters on that switch and may, if desired, transmit the matching packet to the controller. The controller may retrieve counter information (e.g., count values or count rates) from the counters on each of the switches and may use the counter information to perform debugging operations on the network (e.g., the controller may perform network debugging operations based on count information retrieved from the switches and generated in response to network packets matching on the debug table entries).

The controller may perform debugging operations by selecting a given one of the flow table entries and identifying conflicts between matching fields of the selected flow table entry based on the retrieved count information. For example, the controller may select an entry from the flow table on a given switch for debugging, may select a first header (matching) field of the selected entry, and may generate a first debug table entry for the switch that has a first priority, matches only the selected first header field, and instructs the at least one switch to increment a first counter value. The controller may subsequently select a second header field from the selected entry that is different from the first header field, generate a second debug table entry for the switch that has a second priority that is greater than the first priority, matches the first and second selected header fields, and instructs the switch to increment a second counter value. The controller may retrieve the first and second counter values from the at least one switch and identify a header field from the selected entry that conflicts with other header fields in the selected entry based at least partly on the retrieved first and second counter values.

If desired, the controller may perform debugging operations by determining whether elephant packet flows exist between a selected pair of switches in the network based on the retrieved count information. The controller may determine whether elephant packet flows are present between first and second switches by providing a broad debug table entry having a first priority to first and second switches and that matches on a set of packets (e.g., all packets), partitioning the broad debug table entry into at least first and second narrow debug table entries that match respective first and second subsets of the set of network packets, and providing each of the first and second switches with the first and second narrow debug table entries. The first narrow debug table entry may instruct the first switch to increment a first counter and may instruct the second switch to increment a second counter, whereas the second narrow debug table entry may instruct the first switch to increment a third counter and the second switch to increment a fourth counter. The controller may retrieve the first and second counter values from the first switch and the third and fourth counter values from the second switch and may determine whether the elephant flow exists between the first and second switches based on the received first, second, third, and fourth counter values (e.g., based on whether one of the four counter values is significantly greater than the other three values).

The controller may perform the debugging operations by determining whether the switches are performing desired load balancing operations based on the retrieved count information and/or by determining whether a network, path between the switches has changed over time based on the retrieved count information. For example, the controller may perform debugging operations by providing a broad debug table entry to at least one switch that instructs the switch to increment a first counter in response to receiving a first network packet that matches the broad debug table entry. The controller may receive the first network packet, from the switch and may generate and provide a narrow debug table entry to the switch that, includes narrower matching information than the broad debug table entry but that still matches the first network packet. The narrow debug table entry may instruct the switch to increment a second counter in response to receiving a second network packet that matches the narrow debug table entry. The controller may, if desired, retrieve count information generated by the second counter on the switch and determine whether the switch is operating properly for load balancing based on the retrieved count information. The controller may receive a second packet from the switch that matches the broad debug table entry without matching the narrow debug table entry and may compare the received second packet to the narrow debug table entry to determine whether a path has changed in the network.

If desired, the controller may perform the debugging operations by determining whether network packet loss has occurred between a pair of switches in the network based on the retrieved count information and/or by determining whether network packets are taking undesired paths through the network (e.g., paths not identified by the corresponding flow tables) based on the retrieved count information. For example, the controller may retrieve a first counter value from a first switch in the area of interest, a second counter value from a second switch in the area of interest, and a third counter value from a third switch in the area wherein a first, and may determine whether network packets are taking incorrect paths through the area of interest based on the first, second, and third counter values. The controller may retrieve a first counter value from a first, switch in the area of interest and a second counter value from a second switch in the area of interest and may determine whether packet loss has occurred in the area of interest based on the retrieved first and second counter values.

Further features of the present invention, its nature and various advantages will be more apparent from the accompanying drawings and the following detailed description.

BRIEF DESCRIPTION OF THE DRAWINGS

FIG. 4 is a diagram of an illustrative flow table of the type that may be used by a packet processing system showing three illustrative types of packet forwarding that may be performed based on the flow table entries of the flow table in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller such as a controller server or distributed controller server may interact with each of the control clients over respective network links. The use of a cross-platform controller and corresponding controller clients allows potentially disparate network switch equipment to be centrally managed.

Figure 1:
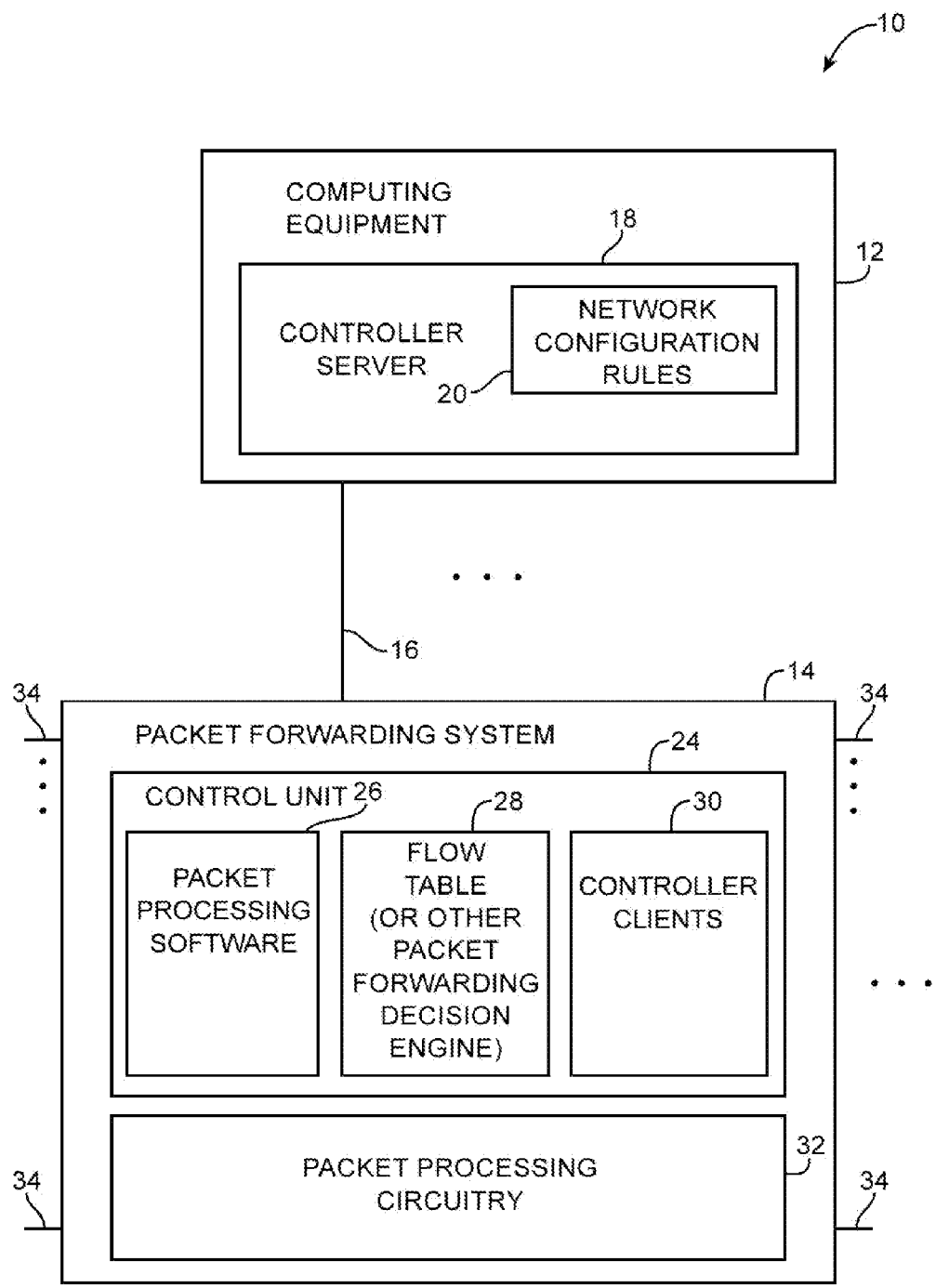
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 (sometimes referred to as controller 18, switch controller 18, or network controller 81) of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed, arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 send corresponding settings data to the hardware in network 10 to ensure that packets flow through the network as desired. Network configuration operations such as these may be performed during system setup operations, continuously in the background, in response to the appearance of newly transmitted data packets (i.e., packets for which a preexisting path has not been established), or at any other desired time during network operation.

Controller server 18 may be used to implement network configuration rules 20. Rules 20 may specify which services are available to various network entities. As an example, rules 20 may specify which users (or type of users) in network 10 may access a particular server. As another example, rules 20 may include service insertion policies identifying network traffic and services that are to be performed on the identified network traffic. Rules 20 may, for example, be maintained in a database at computing equipment 12.

Controller server 18 and controller clients 30 at respective network switches 14 may use network protocol stacks to communicate over network links 16.

Each switch (e.g., each packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0, 1.3.1, or other versions of the OpenFlow protocol). One or more clients among controller clients 30 also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 23 serves as cache storage for flow table entries and a corresponding version of these flow table entries is embedded, within the settings maintained by the circuitry of packet processing circuitry 32. This is, however, merely illustrative. Flow table 28 serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines now switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwarding system 14 to forward network packets to predetermined ports based on attributes of the network packets (e.g., based on network protocol headers).

Any desired switch may be provided with controller clients that communicate with and are controlled by a controller server. For example, switch 14 may be implemented using a general purpose processing platform that runs control software and that omits packet processing circuitry 32. As another example, switch 14 may be implemented using control circuitry that is coupled to one or more high-speed switching integrated circuits ("switch ICs"). As yet another example, switch 14 may be implemented as a line card in a rack-based system having multiple line cards each with its own packet processing circuitry. The controller server may, if desired, be implemented on one or more line cards in the rack-based system, in another rack-based system, or on other computing equipment that is coupled to the network.

Figure 2:
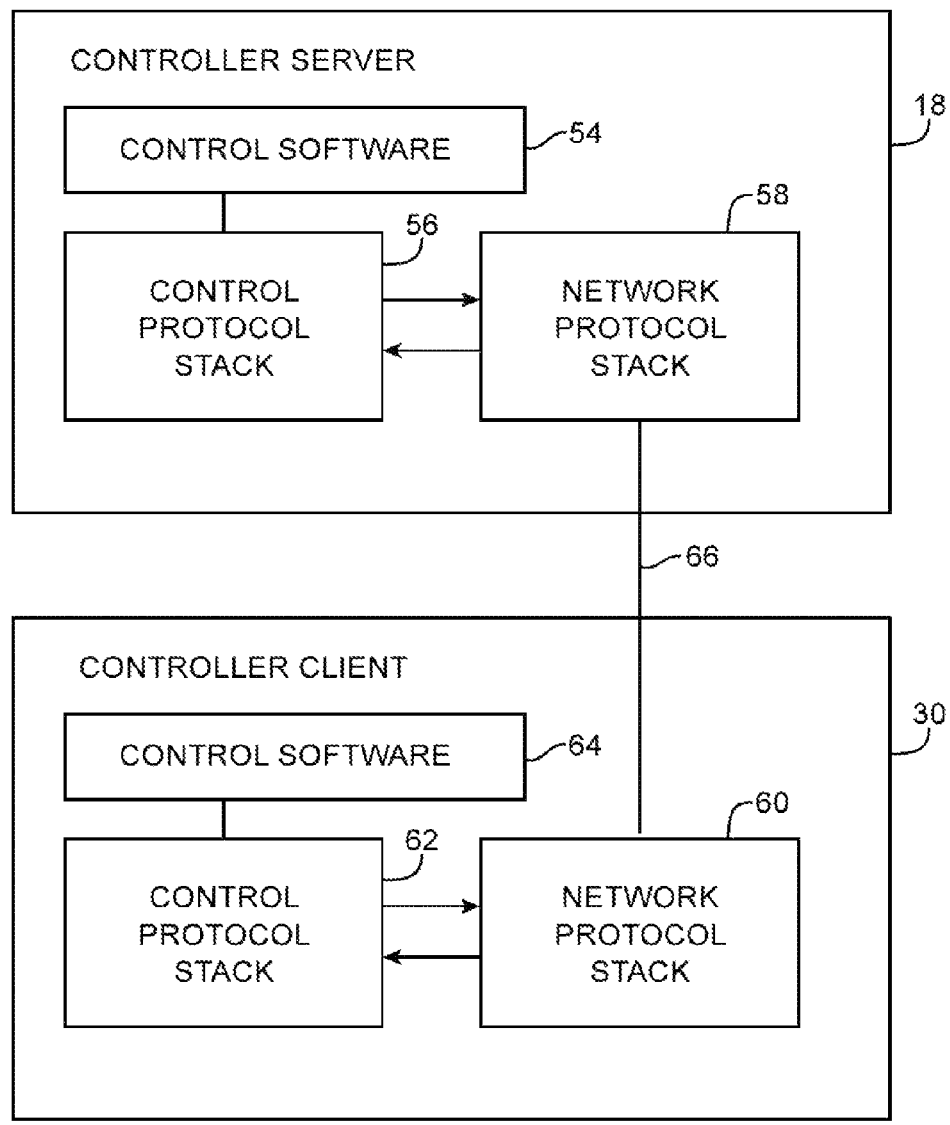
FIG. 2 is a diagram of a controller server and controller client that may communicate over a network connection in accordance with an embodiment of the present invent ion.

As shown in FIG. 2, controller server 18 and controller client 30 may communicate over network path 66 network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a backbone path in a rack-based system. Arrangements in which path 66 is a network path such as path 16 are sometimes described herein as an example.

Control protocol stack 56 serves as an interface between network protocol stack 58 and control software 54. Control protocol stack 62 serves as an Interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 2, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SKMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 3:
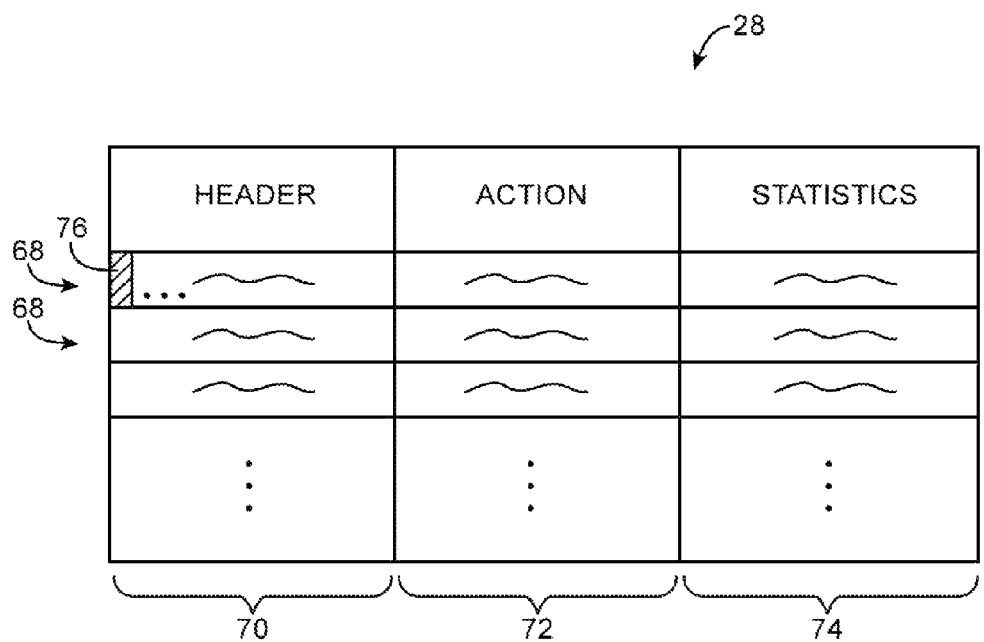
FIG. 3 is a diagram of an illustrative flow table of the type that may be used by a packet processing system in accordance with an embodiment of the present invention.

An illustrative flow table is shown in FIG. 3. As shown in FIG. 3, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Cods (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet, out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port. The modify-field actions may be used in rewriting portions of network packets that match the flow table entry.

FIG. 4 is an illustrative flow table having three flow table entries. The entries include fields with wildcards (e.g., "*" symbols). When a wildcard, is present in a particular field, all incoming packets will be considered to form a "match" with respect to the field, regardless of the particular value of the field in the incoming packet. If desired, one or more fields of the flow table entries may include partial wildcarding. Additional fields may match additional packet information (e.g., packet header information of network packets).

The entry of the first row of the FIG. 4 table directs the switch in which the flow table entry is operating to perform Ethernet switching. In particular, incoming packets with matching Ethernet destination addresses are forwarded to port 3.

The entry of the second row of table of FIG. 4 how a switch may be configured to perform internet routing (i.e., packets are forwarded based on their destination IP address).

The third row of the table of FIG. 4 contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 4 may be loaded into a switch 14 by controller server 18 during system setup operations or may be provided to a switch 14 from controller server 18 in real time in response to receipt and processing of packets at controller server 18 switches such as switch 14. In a network with numerous switches 14, each switch can be provided with appropriate flow table entries to form a path through the network (e.g., each switch may be provided with respective flow table entries for that switch or common flow table entries may be sent to multiple switches).

Figure 5:
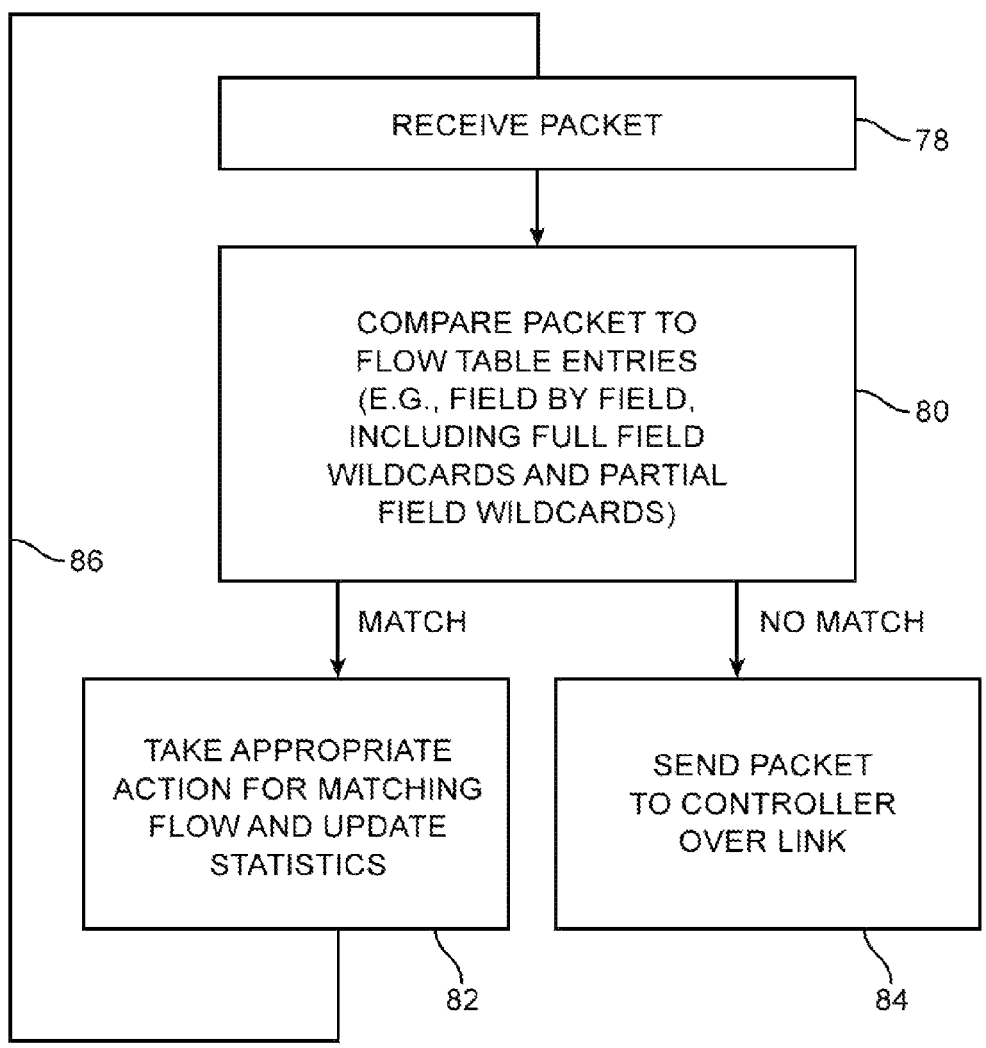
FIG. 5 is a flow chart of illustrative steps involved in processing packets in a packet processing system in accordance with an embodiment of the present invention.

Illustrative steps that may be performed by switch 14 in processing packets that are received on input-output ports 34 are shown in FIG. 5. At step 78, switch 14 a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (e.g., complete addresses). Other fields may contain wildcards (i.e., fields marked with the "don't care" wildcard character of "*"). Yet other fields may have partially complete entries (e.g., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 take into account whether or not each field in the flow table entry contains a complete value without any wildcarding, a partial value with some wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 6:
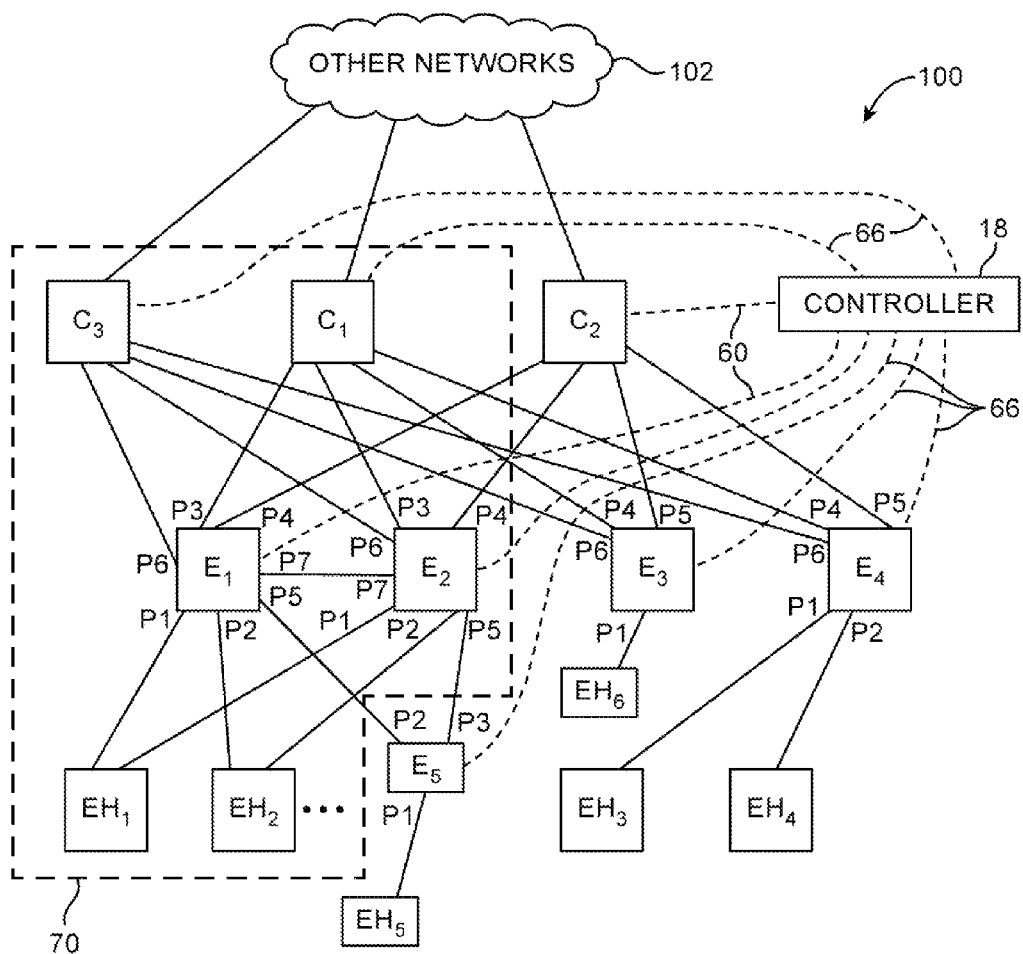
FIG. 6 is a diagram of an illustrative network having switches that may be controlled by a controller for routing network packets through the network and for performing network debugging operations on the network in accordance with an embodiment of the present invention.

FIG. 6 is a diagram of an illustrative network 100 in which switches may be controlled by a controller 18. Controller 18 may be a controller server or a distributed controller implemented across multiple computing devices. As shown in FIG. 6, network 100 may include switches C1, C2, C3, E1, E2, E3, E4, and E5. Controller 18 may be coupled to the switches of network 100 via control paths 66. Controller 18 may control the switches using control paths 66 (e.g., by providing flow table entries such as flow table entries 68 of FIG. 3).

Switches include ports to which other network devices such as switches and end hosts are connected. For example, switch E1 includes ports P1-P6, switch E2 includes ports P1-P6, switch E3 includes ports P1, P4, P5, and P6, and switch E4 includes ports P1, P2, P4, P5, and P6. Network 100 may include end hosts such as end hosts EH1, EH2, EH3, EH4, EH5, and EH6 that are coupled to ports of the switches of network 100. Switches that are directly coupled to end hosts may sometimes be referred to as edge switches, whereas switches that merely interconnect other switches and are not directly coupled to the end hosts may be referred to as core switches. In the example of FIG. 6, switches E1, E2, E3, E4, and E5 are edge switches, because they are coupled to end hosts. Switches C1, C2, and C3 are core switches, because switches C1, C2, and C3 interconnect edge switches E1, E2, E3, E4, and E3 and are not directly coupled to end hosts. Core switches such as switches C1, C3, and C2 couple network 100 to other networks 102 (e.g., other networks including switches and end hosts). The example of FIG. 6 in which edge switches are directly coupled to core switches is merely illustrative. If desired, additional switches may be interposed between the edge and core switches. Network 100 may include client switches such as switches C1, C2, C3, E1, E2, S3, E4, and E5 that are controller by controller 18 and may, for example, include non-client switches that are not controller by controller 18.

If desired, switches may be implemented using computing equipment of network racks. For example, switches in network 100 may be implemented using computing equipment such as a line card of a corresponding network rack. Software switches on the network rack may sometimes be referred to as hypervisor switches. Hypervisor switches may be implemented using dedicated circuitry or using software on discrete computing equipment (e.g., on a line card). However, such software switches are coupled to the rest of the network by cables plugged into dedicated physical ports of the computing equipment on which the software switch is implemented.

It can be challenging for a controller such as controller 18 to efficiently control a network of switches, particularly in scenarios where large numbers of switches are formed on the network. For example, the network topology may be modified by a network administrator or due to device failure. In this scenario, the network modifications may potentially result in invalid configurations at the controller and inefficient packet routing or packet loss in the network. In networks with a large number of switches, it may be difficult to pinpoint the source of packet loss or sources of packet routing inefficiencies in the network (e.g., it may be necessary to identify a source/location of packet loss or routing inefficiency in order to correct the packet loss or inefficiency so that an efficient network is maintained). In some scenarios, controller 18 may inject test packets into network 100 to perform debugging. However, injecting test packets into the network may undesirably increase traffic load on the network and may not be fully characteristic of how the network performs during normal packet forwarding operations.

If desired, controller 18 may actively monitor the switches in network 100 for performing network debugging (debug) operations on network 100 in real time. Controller 18 may perform debugging operations on network 100 by providing the switches in the network with debug table entries for use in dedicated debugging tables in addition to flow table entries for use in flow tables implemented on the switches.

Figure 7:
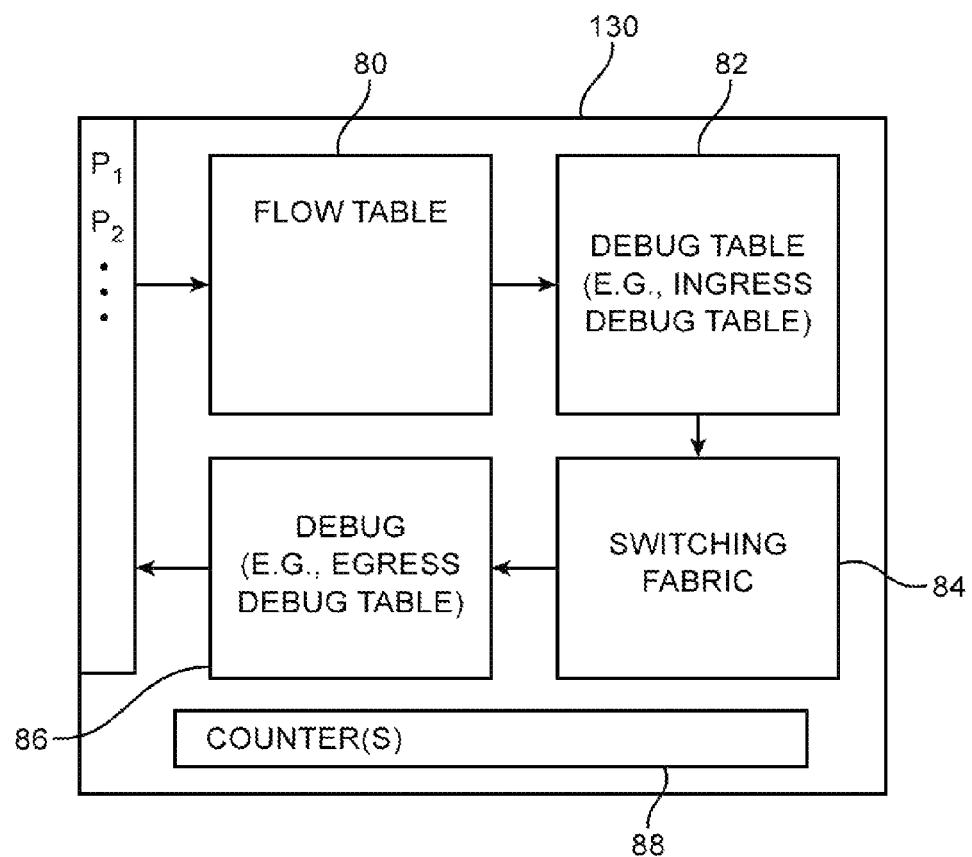
FIG. 7 is a diagram of an illustrative switch that implements forwarding rules such as a flow table for forwarding packets through the network and debugging tables for performing controller-based network debugging operations in accordance with an embodiment of the present invention.

FIG. 7 is an illustrative block diagram of a switch 130 such as a physical or hypervisor switch. Switch 130 may, for example, be an edge switch such as edge switch E1, E2, E3, or E4 of FIG. 6 or may be a core switch such as switches C1, C2, or C3. As shown in FIG. 7, switch 130 may include ports such as ports P1, P2, P3, P4, P5, P6, etc. Switch 130 may include flow tables for routing network packets through network 100 (e.g., from a packet source to a packet destination) such as flow table 80 (e.g., a flow table such as flow table 28 of FIG. 3). Switch 130 may include debugging tables that are separate from flow tables 80 such as ingress debug table 82 and egress debug table 84. Switch 130 may include switching circuitry such as switching fabric 84 and one or more counters 88 (e.g., counting modules that implement one or more hardware and/or software counters).

Flow table 80 may include L2 forwarding modules (e.g., entries that match Ethernet address headers of incoming packets) and/or L3 forwarding modules (e.g., entries that match IP address headers of incoming packets). In general, flow table 80 may include any desired fields for matching incoming network packets that direct switch 80 to route the network packets to an appropriate packet destination in network 100 (e.g., to an appropriate port). Switching fabric 84 may be configured, to route the network packets to the appropriate port (e.g., based on determinations made in flow table module 80) so that network packets are forwarded to a desired portion of network 100. A network packet received at one of the switch ports may be processed by flow table module 80 in determining now to forward the network packet. The operations performed by flow table 80 may be controlled by controller 18 (E.g., based on flow table entries in table 80). The entries in flow table 80 may be generated by controller 18 based on desired network policies for network 100 (e.g., desired packet routing rules, access control lists, or other network policies) for controlling packet forwarding throughout network 100.

Debug tables 82 and 86 may be generated by controller 18 and provided to switch 130 for performing debugging operations on network 100. Debug tables 82 and 86 be provided concurrently with flow table entries in flow table 80, during set up of network 100, when an administrator or user of controller 18 desires to initiate or perform debugging operations on the network, or at any other desired time. Debug tables on switch 130 may include flow table entries that match network packets received from flow table 80 (e.g., network packets may first be matched on flow table 80 and then may subsequently be matched on debug table 82). The debug tables implemented on switch 130 may be defined herein as flow tables of debug table entries (e.g., flow table entries specifically generated for performing debugging operations) that match on received network packets, where the action field of the debug table entries specify that one or more of counters 88 are to be incremented and/or that direct switch 130 to forward the received network packet (or a copy of the received network packet) to controller 18. In contrast with flow table 80, debug tables 82 and 86 do not contain action fields associated with forwarding network packets through network 100 (e.g., from a packet source to a packet destination).

The debug tables on switch 130 may increment counters 88 for use in debugging network 100 when a network packet matches on a debug table entry in table 82 or 86 and may, if desired, provide the network packets to controller 18 for analysis by controller 18 (e.g., for debugging network 100).

Debug table 82 may be used to increment counters for ingress packets and/or provide the ingress network packets (e.g., packets received from flow table 80 provided to an input of switching fabric 84) to controller 18, whereas debug table 84 may be used to increment counters for egress packets (e.g., packets outputted by switching fabric 84 for transmission from switch 130) and/or provide the egress packets to controller 18. Debug tables 82 and 86 may be separate and distinct from flow tables 80 (e.g., flow tables 80 may be associated with network forwarding operations without performing debugging operations whereas debug tables 82 and 86 may be used to perform debugging operations without performing network forwarding of received network packets).

Modules 80, 82, and 86 may be implemented using respective dedicated circuitry, may be implemented using shared dedicated circuitry, or may be implemented using software on processing circuitry. For example, these modules may be implemented using packet processing software 26 of FIG. 1 and/or packet processing circuitry 32 and may perform functions based on control messages (e.g., flow table entries) provided by a controller. Controller 18 may generate debug table entries for switch 130 to control switch 130 to perform desired debugging operations.

Figure 8:
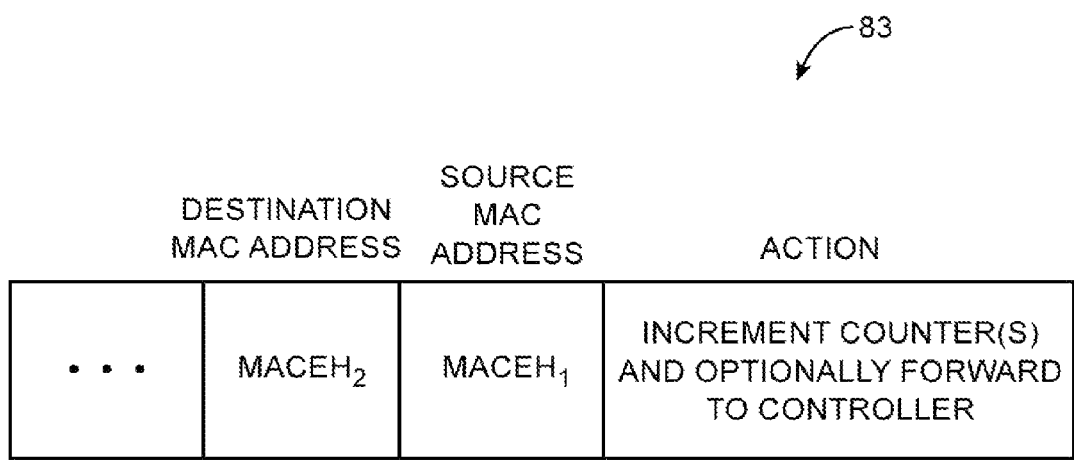
FIG. 8 is a diagram of an illustrative debug table entry that may be implemented on a network switch for incrementing a counter at the switch that is used by a network controller to perform debugging operations on the network in accordance with an embodiment of the present invention.

FIG. 8 is an illustrative debug table entry that controller 18 may generate and provide to switch 130 for performing network debugging operations. As shown in FIG. 8, flow table entry 83 may include the MAC address of end host EH1 in a source MAC address field and the MAC address of end host EH2 in a destination MAC address field (e.g., debug table entry 83 may be generated by controller 18 to debug a portion of network 100 between end hosts EH1 and EH2). Debug table entry 83 may match on all packets having source MAC address MACEH1 and destination MAC address MACEH2 may increment one or more of counters 88 when a matching packet is received and may optionally transmit a copy of the matching packet to controller 18 via control path 66 (e.g., as specified by the action field of debug table entry 83).

Flow table entry 83 may be provided to one or more physical or hypervisor switches in network 100 for performing debug operations. For example, flow table entry 83 may be provided to switch E1. In this scenario, any network packets received by switch E1 from end host EH1 (i.e., having MAC address MACEH1) and destined for end host EH2 (i.e., having MAC address MACEH2) may be routed according to a matching flow table entry in network forwarding flow table 80 (e.g., to port P2 connected to end host EH2 as directed by an appropriate entry in table 80), while counter 88 on switch E1 is incremented (and while copies of the network packets are provided to controller 18 if desired) as determined from the action field of debug table entry 83. This example is merely illustrative and, if desired, the debug table entries may match on any desired packet header fields.

After controller 18 has generated debug table entries and provided the debug table entries to the switches in network 100 for implementation in debug tables 82/86, controller 18 may retrieve count information from counters 88 on the switches (e.g., count information generated in response to network packets matching on entries in debug tables implemented on the switches). For example, controller 18 may periodically retrieve the count information from some or all of the switches in network 100, may retrieve the count information at a predetermined time after providing the entries to the switches, may retrieve the count information in response to determining that debugging operations on the network are needed, may retrieve the count information when instructed to be an administrator of controller 18, or at any other desired time. In another suitable arrangement, switches 130 may periodically transmit count information to controller 18, may transmit count information to controller 18 when an instruction to transmit the count information is received from controller 18, may transmit the count information when it is determined that debugging operations are needed, or may transmit the count information at any other desired time.

Counters 88 may include one or more individual counters that can each be incremented when packets match on debug table entries on the switch. For example, counters 88 may include a first counter and a second counter. Debug table entries implemented on the switch may specify a particular counter to increment when a matching packet is received. Counters 88 may store a count value corresponding to the number of counts N that have been incremented and/or may store a value dN/dT corresponding to the rate of counts (e.g., sometimes referred to herein as count rate values) that have been incremented (e.g., the increase in count value over time). Controller 18 may retrieve the count values or count rate values from switch 130. The count values and count rate values may be indicative of how quickly one or more of counters 88 are incrementing (e.g., indicative of how many network packets are received that match on corresponding debug table entries). In another suitable arrangement, controller 18 may continuously or periodically retrieve count values N from counters 88 and may compute count rate values dN/dT based on the retrieved count values N. Controller 18 may process the counter information for performing debug operations on network 100. For example, controller 18 may monitor the counter information from one or more switches to determine whether network packets are being lost or are taking incorrect paths through network 100.

Figure 9:
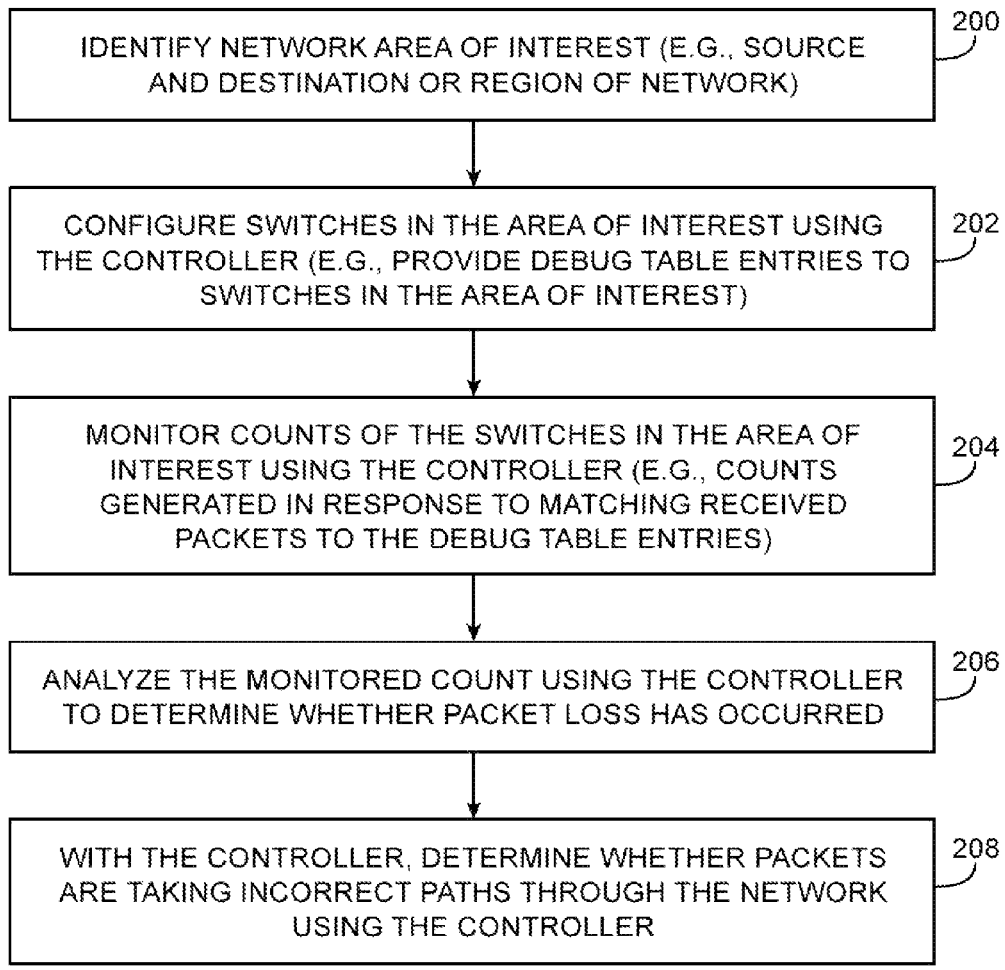
FIG. 9 is a flow chart of illustrative steps that may be processed by a controller in performing network debugging operations by monitoring packet counters maintained on the network switches for determining whether network packets have been lost or have taken incorrect paths through the network in accordance with an embodiment of the present invention.

When performing network debug operations, controller 18 may determine whether network packets are taking incorrect (undesired) routes through network 100 or whether packet loss is occurring (e.g., whether packets are being undesirably dropped in the network). FIG. 9 shows a flow chart of illustrative steps that may be performed by controller 18 to monitor counters 88 on the switches in network 100 for determining whether packet loss is occurring or whether packets are taking incorrect paths through the network.

At step 200, controller 18 may identify a network area of interest on which to perform the debugging operations. For example, controller 18 may identify a source and destination (e.g., two end hosts) or a region of network 100 (e.g., a set of switches and/or end hosts that may or may not be adjacent in the network) as the area of interest. In the example shown in FIG. 6, controller 18 may select network region 70 (as indicated by dashed lines) as the area of interest on which to perform the debugging operations. The scenario where controller 18 performs debugging operations on region 70 of network 100 of FIG. 6 described herein as an example. In general, controller 18 may perform debugging generations on any desired region of any desired network of switches.

At step 202, controller 18 may configure switches in area of interest 70 by providing the switches in region 70 with corresponding flow table entries. For example, controller 18 may provide flow table entries 80 to the switches for performing normal network routing functions and may provide flow table entries in the form of debug tables 82 and 86 to the switches. The debug table entries provided to the switches may include entries that instruct the switches to increment counters 88 when a matching packet is received and/or that instruct the switches to route matching packets to controller 18.

Controller 18 may expect network packets to flow through region of interest 70 according to the network forwarding rules implemented on flow tables 80 in the switches. For example, controller 18 may provide flow table entries to switches in region 70 that instruct packets from source end host EH1 to destination end host EH2 through switches E1, C3, and E2 (e.g., that implement a network forwarding rule that packets from end host EH1 to end host EH2 are only to be forwarded to end host EH2 through switches E1, C3, and E2). However, network packets may occasionally be lost (dropped) over region of interest 70 or may take an incorrect path through the network. Controller 18 may provide debug table entries that instruct the switches to increment corresponding counters 88 and controller 18 may monitor counter values on the switches in region 70 to determine whether packet loss or incorrect packet routing is occurring (e.g., to determine if packets are dropped or packets are not taking the expected forwarding path over switches E1, C3, and E2 between end hosts EH1 and EH2).

At step 204, controller 18 may monitor count values (e.g., counter values) on the switches in region 70 (e.g., counts generated in response to matching received packets to the debug table entries). For example, controller 18 may retrieve and monitor count values generated at switches E1, E2, C3, and C1 in region 70 for performing debugging operations.

At step 206, controller 18 may analyze the monitored counts to determine whether packet loss has occurred. For example, controller 18 may compare count values received from adjacent switches in region 70 to determine whether there is a mismatch between the count values. If a mismatch is present, controller 18 may determine that packet loss has occurred between those two switches and may notify a user of controller 18 (e.g., a network administrator) of the packet loss (e.g., an alert or other notification may be provided to the user indicating that packet loss has occurred and/or indicating the switches between which the packet loss has occurred). For example, if switch E1 has a counter value of 150 for a selected matching network packet that is routed between switches E1 and E2 and switch E2 has a count value of 50 for that network packet, controller 18 may determine that packet loss has occurred between switches E1 and E2 (e.g., because there are 100 matching packets that were counted at switch E1 that were not counted at switch E2). Controller 18 may subsequently notify a user or administrator that packet loss has occurred (e.g., may send an alert to the user identifying that the packet loss has occurred, may identify the magnitude of the packet loss (e.g., 100 packets), and/or may identify switches E1 and E2 associated with the identified packet loss).

At step 208, controller 18 may analyze the monitored counts to determine whether network packets are taking incorrect paths through network 100. For example, controller 18 may measure a counter value at switch C1 corresponding to the selected network packet that was intended to be routed between end hosts EH1 and EH2 via switches E1, C3, and E2. If switch C1 generates a count value by matching a corresponding debug table entry on the selected packets from end host EH1 to end host EH2, controller 18 may thereby determine that some of the selected network packets were incorrectly routed to switch C1 instead of being forwarded along the intended path from switch E1 to switch C3 to switch E2 (e.g., controller 18 may determine that incorrect paths were taken for the packets between end host EH1 and EH2). If desired, controller 18 issue a notification to a system administrator to inform the administrator of the incorrect path being taken by the packets (e.g., may alert the administrator that incorrect paths are being taken, may identify the incorrect path through switch C1 that has been taken, and/or may identify how many packets took the correct and incorrect paths).

The example of FIG. 9 is merely illustrative. If desired, only one of steps 206 and 208 may be performed (e.g., one of steps 206 and 208 may be omitted). Steps 206 208 may be performed in any desired order (e.g., step 208 may be performed prior to step 206, in parallel with step 206, etc.). If desired, controller 18 may monitor counter rate values dN/dT for performing the debug operations. For example, controller 18 may define a time window dT over which a counter rate dN/dT is measured and may process and/or compare how the counter values N increment over the defined window for identifying packet loss or for performing any other desired debugging operations.

Figure 10:
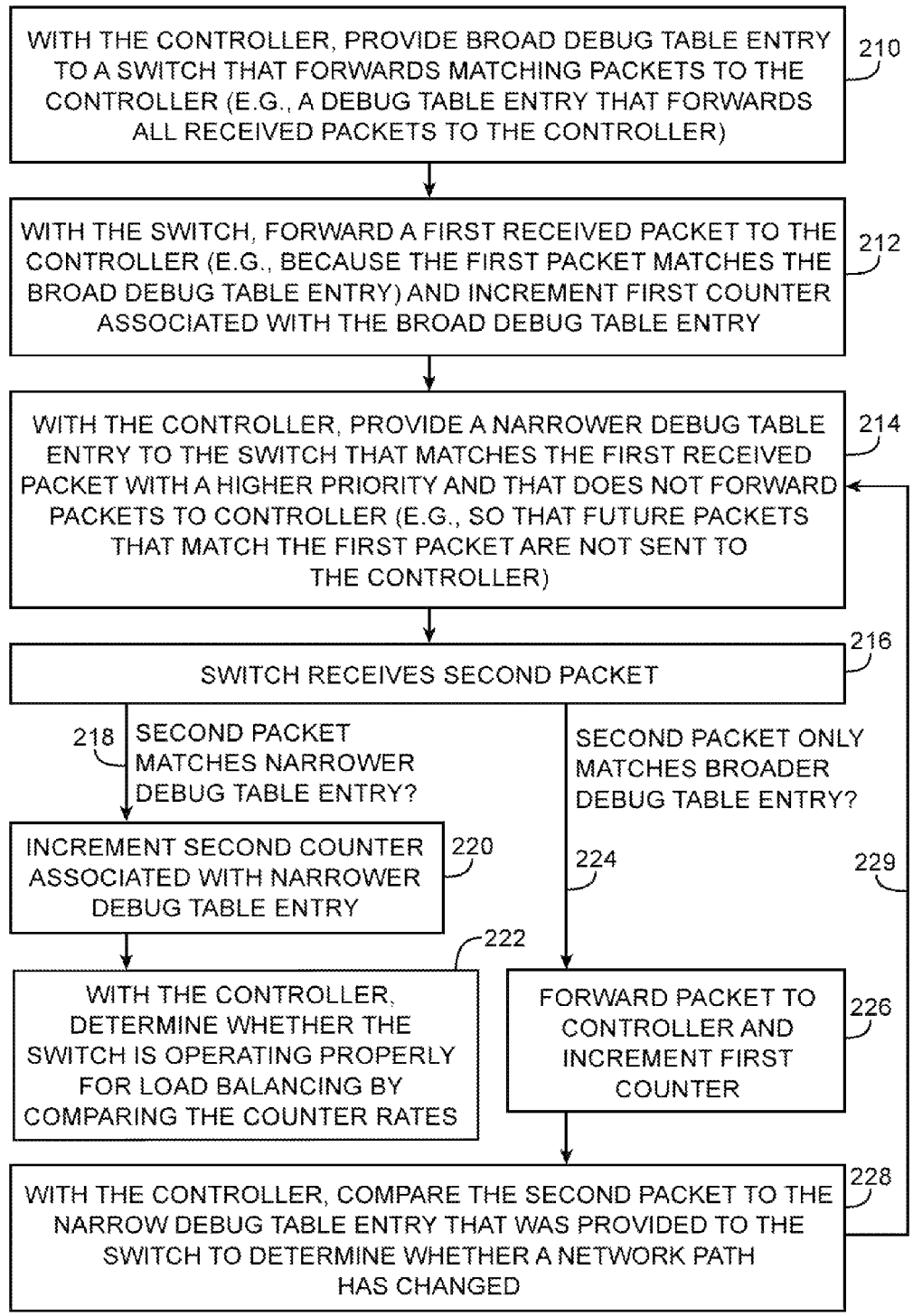
FIG. 10 is a flow chart of illustrative steps that may be used by a controller in performing network debugging operations to determine whether paths in the network have changed over time in accordance with an embodiment of the present invention.

In another suitable arrangement, controller 18 may perform network debug operations (e.g., by providing desired debug table entries to the switches in the network and monitoring counter values) that determine whether network paths have changed in network 100. FIG. 10 shows a flow chart of illustrative steps that may be performed by controller 18 to determine whether network paths have changed over time.

At step 210, controller 18 may provide a broad debug table entry to a selected switch in network 100 and the selected switch may implement the broad debug table entry in its corresponding debug table (e.g., one or both of debug tables 82 and 86). For example, controller 18 may provide the broad debug table entry to switch E1. The broad debug table entry may have an action field that forwards matching packets to controller 18 and that increments a corresponding counter 88 on that switch for each matching network packet that is received and that forwards the matching packet to the controller. For example, the broad debug table entry may match on all incoming network packets and may forward all received packets to the controller (e.g., the broad debug table entry may have completely wildcarded fields and an action field to increment a corresponding counter 88 and to send the matching packet to controller 18).

At step 212, the selected switch may forward a first received network packet to controller 18 (e.g., because the first packet matches on the broad debug table entry). The selected switch may increment a first counter 88 associated with the broad debug table entry upon matching of the first received network packet to the broad debug table entry.

At step 214, controller 18 may receive the first-network packet from the selected switch and may generate a narrower debug table entry that matches the first received packet with a higher priority than the broad debug table entry. Debug table entries implemented on the switches in network 100 may have corresponding priority fields that indicate a priority for matching the entries to network packets. For example, two debug table entries that match on the header fields of the same network packet may have two different corresponding action fields. In this case, the action of the debug table entry having the higher priority (e.g., as indicated by a priority field in the debug table entries) may be performed.

The narrower debug table entry may, for example, match on the header fields of the network packet that was routed to controller 18 at step 212 and may match on the switch port over which the packet was received by the selected switch. For example, the packet received at step 212 may have a source MAC address MACEH1 and a destination MAC address MACEH2 and may have been received by switch E1 over port P1. In this scenario, the narrower debug table entry may match on network packets having source MAC address MACEH1, destination MAC address MACEH2, and that are received at switch E1 over port P1. The generated narrower debug table entry may have an action field that instructs the switch to increment a second counter 88 when a received network packet matches the narrower debug table entry, without forwarding the matching packet to controller 18. Controller 18 may provide the narrower debug table entry that matches the first packet to the selected switch and the selected switch may implement the narrower debug table entry in its corresponding debug table.

At step 216, the selected switch (e.g., after implementing the broad debug table entry and the narrower debug table entry with higher priority than the broad debug table entry) may receive a second network packet. If the second network packet matches the narrower debug table entry implemented on the selected switch (e.g., if the second packet has the same headers and was received over the same switch port as the first packet), processing may proceed to step 220 as shown by path 218. At step 220, the selected switch may increment the second counter associated with the narrower debug table entry.

At step 222, the controller may determine whether the switch is operating properly for load balancing by comparing counter rates between switches on the network. For example, controller 18 may determine whether switches E1 and E2 are load balancing in a desired manner (e.g., whether counters on each of switches E1 and E2 are incrementing in a manner consistent with the desired load balancing scheme between the two switches). If the second packet received at step 216 only matches the broad debug table entry (but does not match the narrower debug table entry), processing may proceed to step 226 as shown by path 224. At step 226, the selected switch may forward the packet to controller 18 and increment the first counter (e.g., according to the action field of the broad debug table entry).

At step 228, the controller may compare the second packet to the narrower debug table entry (e.g., the debug table entry generated to match the first packet at step 214) to determine whether a network path has changed. For example, controller 18 may compare the header fields and information about the switch port over which the second packet was received to the narrower debug table entry. If controller 18 determines that the second packet was generated by the same source end host as the first packet (e.g., if a source address field is the same between the first and second packets) but the second packet was received over a different switch port than the first packet (e.g., received at port P2 of E1 instead of port P1 over which the first network packet was received), controller 18 may determine that a path (route) has changed in network 100 (e.g., because packets generated by the same source end host EH1 followed two different paths coupled to different ports on the switch). Controller 18 may subsequently notify a system administrator that a path has changed in the network (e.g., controller 18 may identify the selected switch and/or how the path has changed).

If desired, processing may loop back to step 214 shown by path 229 and controller 18 may continue to monitor the switches for additional path changes in the network (e.g., based on counter information associated with additional network packets that are received at the selected switch). The steps of FIG. 10 may, if desired, be repeated for other switches on the network to detect path changes. For example, the steps of FIG. 10 may be performed for all of the switches in network 100 or a subset of the switches in network 100. If desired, a system administrator of controller

18 may identify which switches in network 100 for which to perform path change detection operations.

Figure 11:
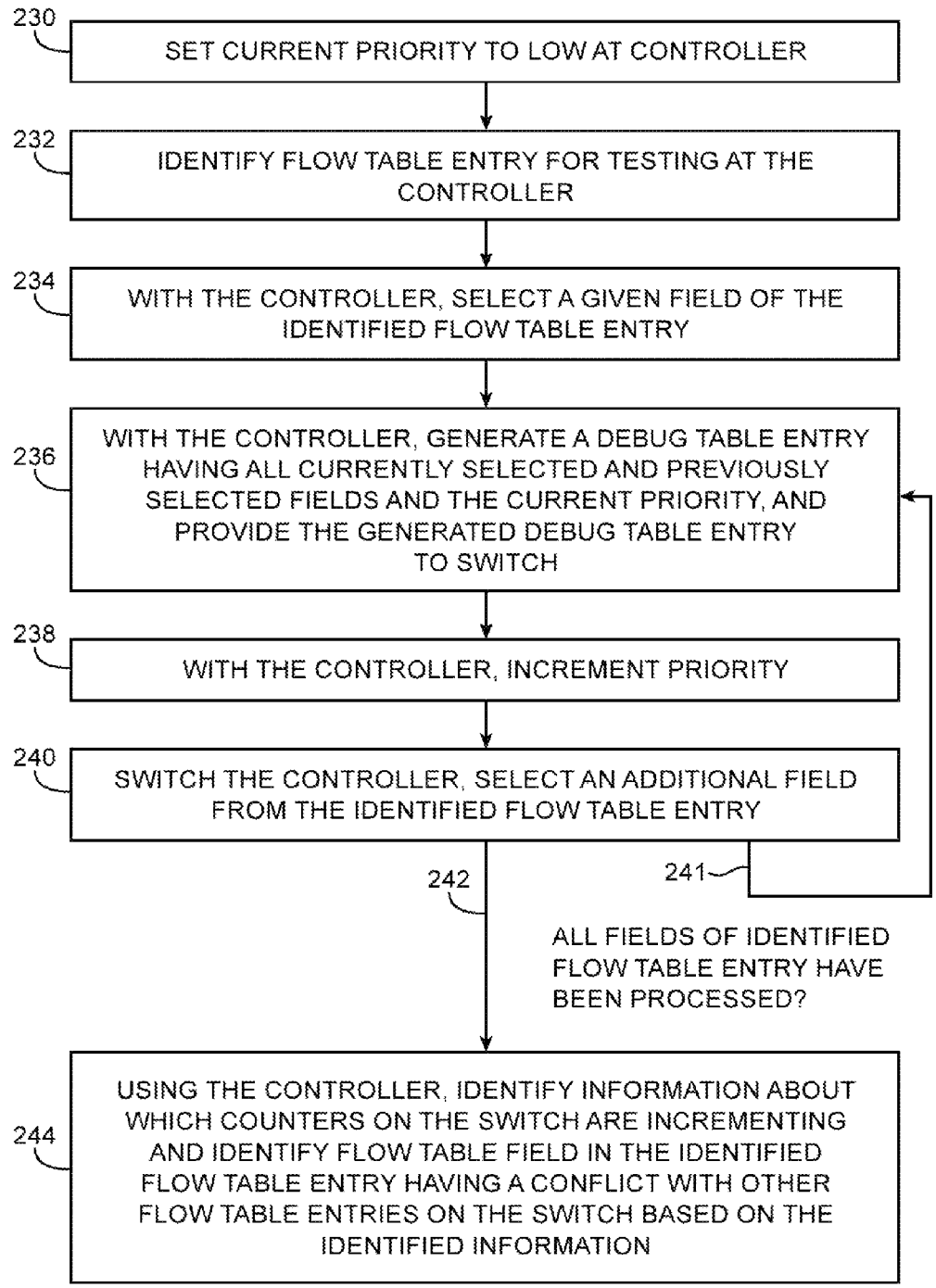
FIG. 11 is a flow chart of Illustrative steps that may be processed by a controller in performing network debugging operations to determine whether there are conflicts between flow table entries implemented on switches in the network in accordance with an embodiment of the present invention.

If desired, controller 18 may perform network debug operations that identify conflicts between flow table entries implemented on the switches in network 100 using the debug tables implemented on the switches. FIG. 11 shows a flow chart of illustrative steps that may be performed by controller 18 to identify conflicts between flow table entries in network 100. The steps of FIG. 11 may be performed, for example, by controller 18 when a desired flow table entry implemented on the switches is not functioning properly (e.g., when packets are not being routed according to the desired flow table entry) to identify any conflicts in the corresponding flow table that could prevent the flow table entry from being properly implemented by the switches.

At step 230, controller 18 may set the current priority to low (e.g., a current priority of a debug table entry to be generated).

At step 232, controller 18 may identify a flow table entry in normal network flow table 80 for testing (e.g., a flow table entry implemented on a selected switch). For example, controller 18 may select a flow table entry for testing that is not functioning properly when implemented on the switches. In this scenario, there may be a conflict between the selected flow table entries and other flow table entries implemented on the switches that is preventing the selected flow table entry from functioning properly.

At step 234, controller 18 may select a given field of the identified flow table entry for processing (e.g., a source IP address field, destination MAC address field, TCP port field, etc.). As an example, controller 18 may select the source IP address field for processing.

At step 236, controller 18 may generate a debug table entry for debug table 82/86 having the selected field and the current (low) priority. For example, controller 18 may generate a debug table entry having the source IP address field of the selected flow table entry. Controller 18 may provide the generated debug table entry to the selected switch.

At step 238, controller 18 may increment the current priority (e.g., to a higher priority).

At step 240, the controller may select an additional field from the selected flow table entry for processing. Processing may loop back to step 236 as shown by path 241 to generate an additional debug table entry having all currently selected and previously selected fields of the selected flow table entry and having the incremented priority. For example, the additional debug table entry may have the source IP address field of the selected flow table entry, the source MAC address field of the selected flow table entry, and a higher priority than the first debug table entry. The additional debug table entry may be provided to the selected switch.

This process may be repeated until each of the fields of the selected flow table entry have been processed. In this way, a number of debug table entries may be generated for the selected switch that corresponds to the number of fields in the selected flow table entry, where each successive debug table entry includes the previous fields of the selected flow table entries and one additional field from the selected flow table entry. Once all fields of the selected flow table entries have been processed (e.g., and a corresponding number of debug table entries have been generated and provided to the selected switch), processing may proceed to step 244 as shown by path 242. Each debug table may match on incoming packets and may increment a corresponding respective counter and may forward the incoming packet to the controller when the incoming packet matches that debug table entry.

At step 244, controller 18 may identify information about which counters on the switch are incrementing and may identify a flow table field in the selected flow table entry having a conflict with other flow table entries on the selected switch based on the identified counter information. For example, the debug table entry corresponding to the first counter value that is incremented may identify the field in which the conflict exists (e.g., the field in which the conflict exists may be the additional field of the last debug table entry that did not increment a corresponding counter). Controller 18 may notify a system administrator of the flow table field that caused the conflict (e.g., so the system administrator may generate new flow table entries that resolve the conflict).

Figure 12:
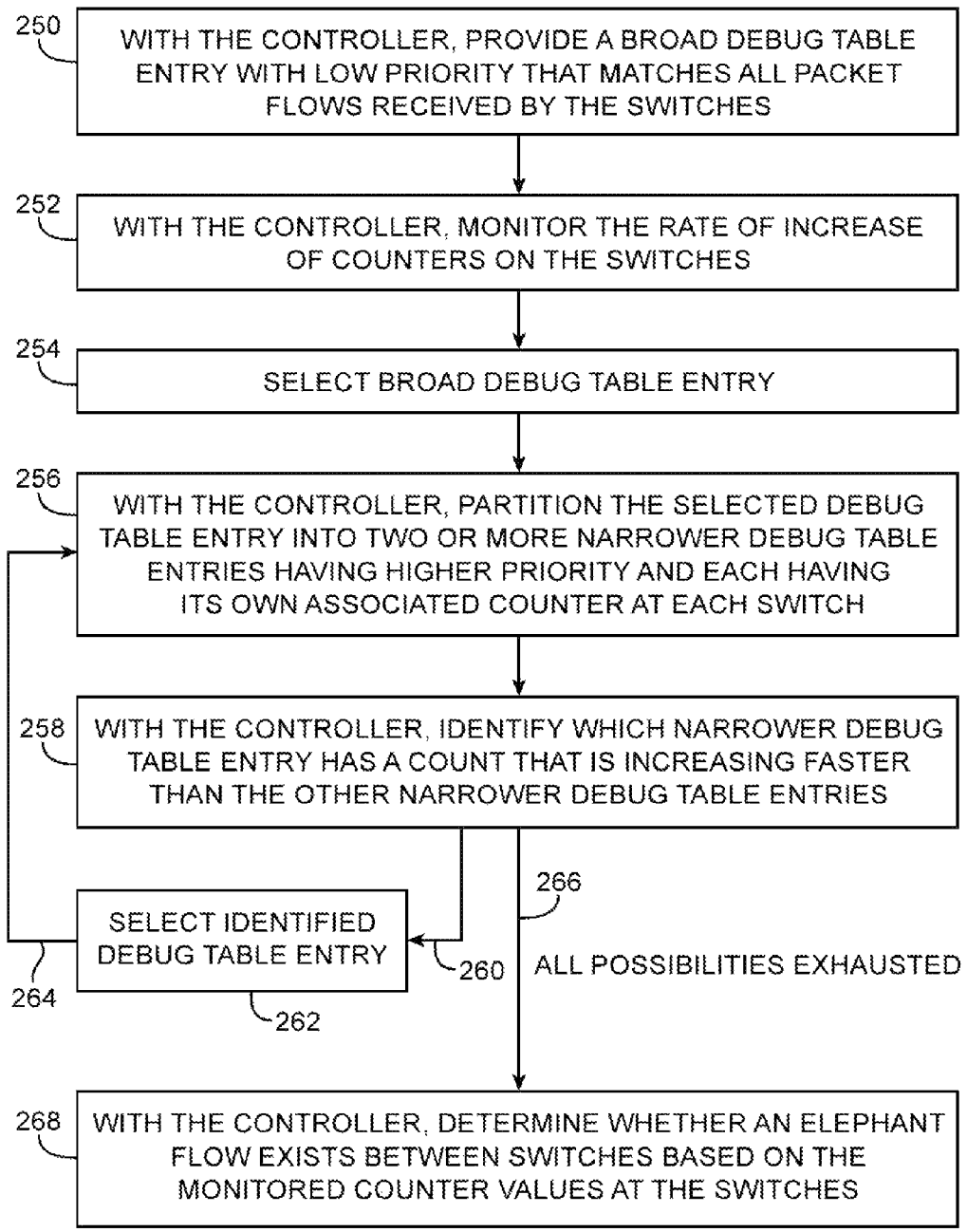
FIG. 12 is a flow chart of illustrative steps that may be processed by a controller in performing network debugging operations to determine whether there are elephant packet flows between switches in the network in accordance with an embodiment of the present invention.

If desired, controller 18 may perform network debug operations to identify excessively large data flows (e.g., so-called "elephant flows") between two switches in network 100. FIG. 12 shows a flow chart of illustrative steps that may be performed by controller 18 to identify elephant flows in the network.

At step 250, controller 18 may generate and provide a broad debug table entry with low priority that matches all received packet flows to the switches in network 100 (e.g., a debug table entry having all wildcarded matching fields).

At step 252, controller 18 may monitor the rate of increase dN/dT of counters on the switches. For example, controller 18 may retrieve counter data from first and second selected switches in network 100 and may monitor the rate of increase of the counters (e.g., controller 18 may monitor count rate values dN/dT of a first counter 88 from switches E1 and E2 that are associated with the broad debug table entry.

At step 254, controller 18 may select the broad debug table entry.

At step 256, controller 18 may partition the selected debug table entry into two or more narrower debug table entries having a higher priority and each having its own associated counter 88 at each of the selected switches (e.g., controller 18 may perform a binary search operation or may divide the broader entry into two or more narrower debug table entries). Controller 18 may provide the narrower debug table entries to the selected switches. For example, if the broad debug table entry matches packets on a range of source IP addresses such as IP addresses $IP_0$-$IP_{100}$, controller 18 may partition the broad debug table entry into a first narrower debug table entry that matches source IP addresses $IP_0$-$IP_{50}$ and a second narrower debug table entry that matches source IP addresses $IP_{51}$-$IP_{100}$. The first and second narrower debug table entries may be provided with a higher priority than the broad debug table entry and may increment respective counters 88 (e.g., second and third counters) when a received packet matches the associated narrower debug table entry (e.g., a higher priority than the low priority set at step 250).

At step 258, controller 18 may retrieve counter information (e.g., from the second and third counters) associated with the narrower debug table entries from one or both of the selected switches and may identify which narrower debug table entry has a count that is increasing at a greater rate than the other narrower debug table entries. For example, a second counter 88 associated with the first narrower debug table entry that matches on IP addresses $IP_0$-$IP_{50}$ (e.g., a counter that increments when a received packet matches the first narrower debug table entry) may increase at a first rate and a third counter associated with the second narrower debug table entry that matches on IP addresses $IP_{51}$-$IP_{100}$ may increase at a second rate that is greater than the first rate. Processing may subsequently proceed to step 262 as shown by path 260.

At step 262, controller 18 may select the identified narrower debug table entry. Processing may subsequently loop back to step 256 as shown by path 264 to partition the identified narrower debug table entry into even narrower debug table entries for processing. Once all possibilities for narrowing the debug table entries have been exhausted, processing may proceed to step 268 as shown by path 266.

At step 268, controller 18 may determine whether an elephant flow exists between switches in the network (e.g., between the selected first and second switches) based on the monitored counter values at the switches. If the narrowest debug table entries all have similar counter rates, controller 18 may determine that no elephant flow exists (e.g., controller 18 may determine that there are many smaller, so-called "mice flows" between the switches but no excessive elephant flows). If one of the narrowest debug table entries has a counter rate that is substantially greater than the others (e.g., more than 50% greater than the other counter rates), controller 18 may identify an elephant flow corresponding to that debug entry and may notify a system administrator of the elephant flow (e.g., and may provide information to the administrator about the elephant flow such as the switches between which the elephant flow is located, the magnitude of the elephant flow, or the matching fields associated with the elephant flow). For example, if a counter rate corresponding to a debug table entry having a source IP address $IP_2$ is significantly greater than a counter rate corresponding to debug table entries having source IP addresses $IP_0$, $IP_1$, and $IP_{3-50}$ etc., controller 18 may identify that an elephant flow exists between the selected switches in the network for source IP address $IP_2$.

Figure 13:
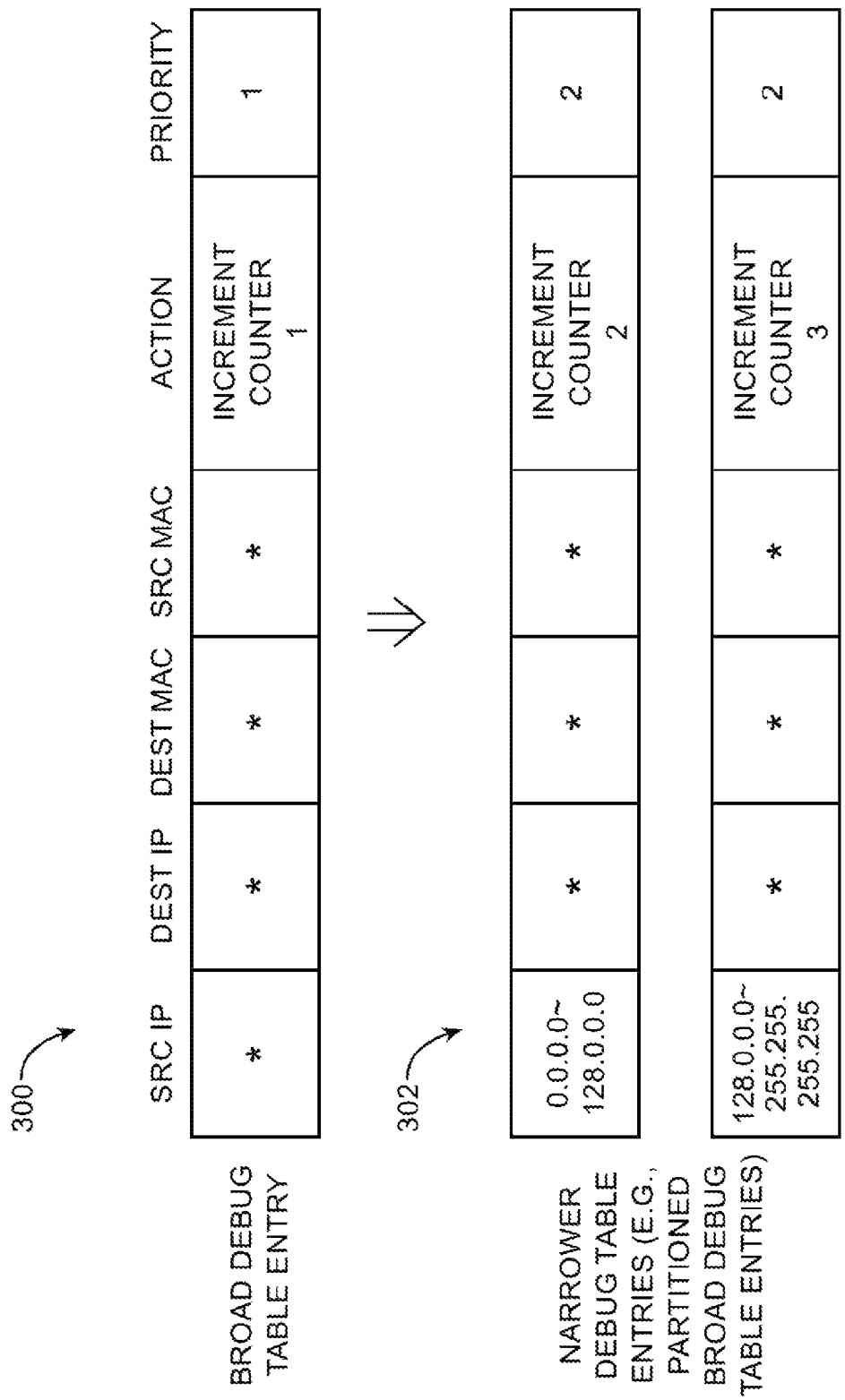
FIG. 13 is an illustrative diagram showing how broad debug table entries may be generated by a controller and narrowed by the controller for detecting elephant flows between switches in the network in accordance with an embodiment of the present invention.

FIG. 13 shows an example of broad and narrow debug table entries that may be generated at controller 18 for detecting elephant flows in the network. As shown in FIG. 13, broad debug table entry 300 may match all incoming packets (e.g., all source and destination IP and MAC addresses, etc.) and may increment a first counter with a first priority. Controller 18 may partition entry 300 into two narrower entries 302 (e.g., while processing step 256 of FIG. 11), where a first of the narrower entries matches a first range of IP addresses 0.0.0.0-128.0.0.0 and a second of the narrower entries matches a second range of IP addresses 128.0.0.0-255.255.255.255. Each narrower entry may increment a respective counter when a matching packet is received and may have a priority 2 that is higher than the priority of broad entry 300. Controller 18 may monitor counters 2 and 3 to determine which of the narrower entries to further partition for identifying the elephant flows. In this way, controller 18 may identify elephant flows that may be associated with inefficiencies in packet forwarding across network 100. The example of FIG. 13 is merely illustrative and, if desired, any header fields may be used for partitioning to determine whether elephant flows exist in the network.

The foregoing is merely illustrative of the principles of this invention and various modifications can be made by those skilled in the art without departing from the scope and spirit of the invention.

What is claimed is:

1. A method of using a controller that controls switches in a network, the method comprising:
  with the controller, providing debug table entries having matching information to the switches, wherein the debug table entries instruct the switches to increment corresponding counters in response to receiving network packets that match the matching information;
  with the controller, retrieving count information from the switches that were generated by the corresponding counters on the switches;
  with the controller, identifying first, second, and third counter rate values from the retrieved count information, wherein the first counter rate value comprises a change in a first counter value over time, the second counter rate value comprises a change in a second counter value over time, and the third counter rate value comprises a change in a third counter value over time; and
  with the controller, determining whether an elephant packet flow exists between first and second switches in the network based on at least the identified first, second, and third counter rate values, wherein determining whether the elephant packet flow exists comprises:
    with the controller, providing a broad debug table entry having a first priority to a first switch, wherein the broad debug table entry matches a set of network packets, and wherein the broad debug table entry instructs the first switch to increment the first counter value;
    with the controller, partitioning the broad debug table entry into first and second narrow debug table entries that have a second priority that is higher than the first priority and that match respective first and second subsets of the set of network packets;
    with the controller, providing the first and second narrow debug table entries to the first switch, wherein the first narrow debug table entry instructs the first switch to increment the second counter value and the second narrow debug table entry instructs the first switch to increment the third counter value; and
    with the controller, determining whether the third counter rate value is greater than the second counter rate value.

2. The method defined in claim 1, further comprising:
  with the controller, identifying network policy rules associated with forwarding network packets through the network over the switches; and
  with the controller, providing flow table entries to the switches that implement the identified network rules.

3. The method defined in claim 2, further comprising:
  with the controller, selecting a given one of the flow table entries; and
  with the controller, identifying conflicts between different matching fields of the selected flow table entry based on the retrieved count information.

4. The method defined in claim 1, further comprising:
  determining whether the switches are performing desired load balancing operations based on the first counter rate value.

5. The method defined in claim 1, further comprising:
  with the controller, determining whether a network path between the switches has changed over time based on the retrieved count information.

6. The method defined in claim 1, further comprising:
  determining whether network packet loss has occurred between a pair of switches in the network based on the first counter rate value.

7. The method defined in claim 1, further comprising:
   determining whether network packets are taking undesired paths through the network based on the first counter rate value.

8. The method defined in claim 1, wherein the switches comprise a given switch having a switching fabric coupled between ports of the given switch, wherein providing the debug table entries to the switches comprises:
   providing the given switch with egress debug table entries for an egress debug table implemented on the given switch and ingress debug table entries for an ingress debug table implemented on the given switch, wherein the ingress debug table is coupled between the ports and an input of the switching fabric of the given switch, and wherein the egress debug table is coupled between an output of the switching fabric and the ports of the given switch.

9. The method defined in claim 1, wherein determining whether the elephant packet flow exists further comprises:
   with the controller, in response to determining that the third count rate value is greater than the second count rate value, partitioning the second narrow debug table entry into first and second narrower debug table entries that have a third priority that is higher than the second priority and that match respective third and fourth subsets of the second subset of the set of network packets;
   with the controller, providing the first and second narrower debug table entries to the first switch, wherein the first narrower debug table entry instructs the first switch to increment a fourth counter value and the second narrower debug table entry instructs the first switch to increment a fifth counter value; and
   with the controller, determining whether the fourth counter value is increasing at a greater rate than the fifth counter value.

10. A method of using a controller that controls switches in a network having end hosts that are coupled to the switches, the method comprising:
    with the controller, directing packet forwarding through the network by providing at least one switch in the network with entries for a flow table implemented on the switch; and
    with the controller, performing network debugging operations by providing the at least one switch with debug table entries for a debug table implemented on the switch that is separate from the flow table, wherein each debug table entry includes matching information and instructs the switch to increment a corresponding counter in response to receiving a network packet that matches the matching information, wherein performing the network debugging operations further comprises:
    selecting an entry from the flow table on the at least one switch for debugging;
    selecting a first header field of the selected entry;
    generating a first debug table entry for the at least one switch, wherein the first debug table entry has a first priority, matches the selected first header field, and instructs the at least one switch to increment a first counter value;
    selecting a second header field from the selected entry that is different from the first header field;
    generating a second debug table entry for the switch, wherein the second debug table entry has a second priority that is greater than the first priority, matches the first and second selected header fields, and instructs the at least one switch to increment a second counter value that is different from the first counter value;
    retrieving the first and second counter values from the at least one switch; and
    identifying a header field from the selected entry that conflicts with other header fields in the selected entry based at least partly on the retrieved first and second counter values.

11. The method defined in claim 10, wherein providing the at least one switch with the debug table entries comprises providing the switch with egress debug table entries for an egress debug table implemented on the switch and ingress debug table entries for an ingress debug table implemented on the switch.

12. The method defined in claim 10, wherein the first debug table entry matches only the selected first header field.

13. A method of using a controller that controls switches in a network, the method comprising:
    with the controller, identifying an area of interest on the network;
    with the controller, providing debugging table entries for debugging tables implemented on switches in the identified area of interest, wherein the debugging table entries instruct the switches to increment corresponding counter values when the switches receive a network packet that matches at least one of the debugging table entries, wherein providing the debugging table entries comprises:
    providing a broad debugging table entry to a given switch in the area of interest, wherein the broad debugging table entry has a first priority, matches on a set of network packets, instructs the given switch to forward the set of network packets to the controller, and instructs the given switch to increment a first counter value in response to reception of each of the network packets in the set of network packets, and
    with the controller, in response to receiving at the controller a first network packet from the set of network packets forwarded to the controller by the given switch, providing a narrow debug table entry to the given switch, wherein the narrow debug table entry matches on the first network packet, has a second priority that is higher than the first priority, and instructs the given switch to increment a second counter value in response to reception of additional network packets that match on the narrow debug table entry without forwarding the additional network packets to the controller;
    with the controller, retrieving the first and second counter values from the given switch in the identified area of interest; and
    with the controller, debugging the switches in the identified area of interest based on the retrieved first and second counter values.

14. The method defined in claim 13, further comprising:
    with the controller, identifying network policies associated with forwarding network packets through the network; and
    with the controller, providing flow table entries to the switches in the area of interest that implement the identified network policies, wherein the flow table entries are different from the debugging table entries.

* * * * *